US012109581B2

(12) United States Patent
Medina et al.

(10) Patent No.: US 12,109,581 B2
(45) Date of Patent: Oct. 8, 2024

(54) ROTORY BELL ATOMIZER SHAPING AIR CONFIGURATION AND AIR CAP APPARATUS

(71) Applicant: Graco Minnesota Inc., Minneapolis, MN (US)

(72) Inventors: Daniel L. Medina, St. Paul, MN (US); Dawn P. Svenkeson-Koubal, Wayzata, MN (US); Elisa J. McCline, Elk River, MN (US); Mark S. Jennen, Eden Prairie, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 334 days.

(21) Appl. No.: 17/460,932

(22) Filed: Aug. 30, 2021

(65) Prior Publication Data

US 2021/0387213 A1 Dec. 16, 2021

Related U.S. Application Data

(60) Provisional application No. 63/194,479, filed on May 28, 2021.

(51) Int. Cl.

| | |
|---|---|
| ***B05B 5/04*** | (2006.01) |
| ***B05B 3/10*** | (2006.01) |
| ***B05B 7/08*** | (2006.01) |

(52) U.S. Cl.
CPC .......... *B05B 5/0426* (2013.01); *B05B 3/1092* (2013.01); *B05B 5/0407* (2013.01); *B05B 7/0815* (2013.01); *B05B 3/1014* (2013.01)

(58) Field of Classification Search
CPC ....... B05B 3/10; B05B 3/1007; B05B 3/1014; B05B 3/1092; B05B 5/0407;
(Continued)

(56) References Cited

U.S. PATENT DOCUMENTS

| | | | |
|---|---|---|---|
| 4,415,275 | A | 11/1983 | Dietrich |
| 4,997,130 | A | 3/1991 | Weinstein |

(Continued)

FOREIGN PATENT DOCUMENTS

| | | | |
|---|---|---|---|
| CN | 101795780 | A | 8/2010 |
| CN | 105473234 | A | 4/2016 |

(Continued)

OTHER PUBLICATIONS

Second Chinese Office Action for CN Application No. 202210593560.7, Dated Oct. 26, 2023, p. 16.

(Continued)

*Primary Examiner* — Darren W Gorman
(74) *Attorney, Agent, or Firm* — Kinney & Lange, P. A.

(57) ABSTRACT

A shaping air ring for a rotary bell atomizer spray device includes a plurality of circumferentially spaced nozzles disposed in the shaping air ring, wherein each nozzle has a mix chamber, at least one inlet on an upstream end of the mix chamber, and an outlet at a downstream end of the mix chamber. First and second air flows are provided to the mix chamber through the at least one inlet and a combined air flow is discharged through the outlet. The combined air flow shapes the spray pattern of the liquid sprayed by the rotary bell atomizer spray device.

15 Claims, 7 Drawing Sheets

(58) Field of Classification Search
CPC ....... B05B 5/0426; B05B 7/02; B05B 7/0807; B05B 7/0815; B05B 7/083; B05B 12/18
See application file for complete search history.

(56) References Cited

U.S. PATENT DOCUMENTS

| | | | | |
|---|---|---|---|---|
| 6,050,499 | A | 4/2000 | Takayama et al. | |
| 6,991,178 | B2 | 1/2006 | Nolte et al. | |
| 7,611,069 | B2 | 11/2009 | Clifford et al. | |
| 8,097,293 | B2 | 1/2012 | Wohr et al. | |
| 8,490,572 | B2 * | 7/2013 | Mitsui | B05B 5/0407 239/293 |
| 8,642,131 | B2 | 2/2014 | Nolte et al. | |
| 8,794,177 | B2 * | 8/2014 | Shigekura | B05B 3/1014 239/708 |
| 8,827,181 | B2 | 9/2014 | Nolte et al. | |
| 8,828,496 | B2 * | 9/2014 | Kurata | B05B 3/1092 427/427.2 |
| 8,881,672 | B2 | 11/2014 | Fischer et al. | |
| 8,973,850 | B2 | 3/2015 | Perinet et al. | |
| 9,314,806 | B2 * | 4/2016 | Ballu | B05B 3/1092 |
| 9,604,233 | B2 | 3/2017 | Yamauchi | |
| 9,833,797 | B2 * | 12/2017 | Yamada | B05B 5/0403 |
| 9,943,864 | B2 | 4/2018 | Mitsui et al. | |
| 10,335,809 | B2 * | 7/2019 | Prus | B05B 5/0426 |
| 10,343,179 | B2 | 7/2019 | Ito et al. | |
| 10,399,096 | B2 * | 9/2019 | Yamauchi | B05B 15/555 |
| 10,413,921 | B1 | 9/2019 | van der Steur et al. | |
| 10,919,065 | B2 | 2/2021 | Medard et al. | |
| 2003/0010840 | A1 | 1/2003 | Kon et al. | |
| 2009/0020626 | A1 * | 1/2009 | Seitz | B05B 3/1014 239/338 |
| 2009/0314855 | A1 | 12/2009 | Seitz | |
| 2011/0000974 | A1 | 1/2011 | Nolte et al. | |
| 2018/0008997 | A1 | 1/2018 | Medard et al. | |
| 2018/0185859 | A1 * | 7/2018 | Kishimoto | B05D 1/02 |
| 2018/0221896 | A1 * | 8/2018 | Yamada | B05B 5/0407 |
| 2019/0224699 | A1 | 7/2019 | Yamauchi | |
| 2020/0338583 | A1 * | 10/2020 | Takeda | B05D 1/04 |
| 2021/0394206 | A1 * | 12/2021 | Perinet | B05B 3/1092 |

FOREIGN PATENT DOCUMENTS

| | | | |
|---|---|---|---|
| CN | 107614118 | A | 1/2018 |
| CN | 108367304 | A | 8/2018 |
| EP | 1849527 | B1 | 6/2019 |
| JP | H07148447 | A | 6/1995 |
| JP | H10296136 | A | 11/1998 |
| JP | 2003236424 | A | 8/2003 |
| WO | 2020185364 | A1 | 9/2020 |

OTHER PUBLICATIONS

Extended European Search Report for EP Application No. 22175916.0, Dated Oct. 27, 2022, p. 10.

First Chinese Office Action for CN Application No. 202210593560.7, Dated Apr. 13, 2023, p. 20.

* cited by examiner

ROTARY BELL ATOMIZER SHAPING AIR CONFIGURATION AND AIR CAP APPARATUS

CROSS-REFERENCE TO RELATED APPLICATION(S)

This application claims the benefit of U.S. Provisional Application No. 63/194,479 filed May 28, 2021 for "ROTARY BELL ATOMIZER SHAPING AIR CONFIGURATION AND AIR CAP APPARATUS" by D. Medina, D. Svenkeson-Koubal, E. McCline, and M. Jennen.

BACKGROUND

The present disclosure is related generally to spray devices and more specifically to electrostatic rotary bell atomizer spray devices.

Rotary bell atomizer spray devices are commonly used to apply coatings to workpieces. Conventional rotary bell atomizer spray devices use shaping air to direct coating particles expelled from a peripheral edge of the rotating bell toward a workpiece. A shaping air ring is positioned behind and radially outward of the peripheral edge of the bell to direct jets of air toward the peripheral edge of the bell to entrain and transport a coating material to the workpiece. Two sets of shaping air holes are typically circumferentially spaced around the shaping air ring in multiple concentric rows or other orientations to provide control of the spray pattern. Each set of shaping air holes can be separately supplied with pressurized air and can be independently controlled to change the pattern of the spray.

U.S. Pat. No. 8,973,850, assigned to Sames Technologies, discloses a rotary bell atomizer with a plurality of primary orifices (4) and secondary orifices (6). These orifices are structured to eject, respectively, primary airjets ($J_4$) and secondary airjets ($J_6$) from an end face of the atomizer body. The arrangement of adjacent primary and secondary orifices leads to the intersection ($R_{46}$ shown in FIG. 5 of '850 Patent) of a primary airjet with a secondary airjet, such intersection occurring between the orifices and the rotary bell edge.

U.S. Pat. No. 8,827,181, assigned to Durr Systems GmbH, discloses shaping air nozzles configured to discharge the shaping air stream substantially perpendicularly to a plane indicated by a substantially flat portion of the end face.

U.S. Pat. No. 8,881,672, assigned to Durr Systems GmbH, discloses a first shaping air nozzle annulus with a plurality of axially orientated shaping air nozzles (6) and a second shaping air nozzle annulus with a plurality of shaping air nozzles (7).

U.S. Pat. No. 8,490,572, assigned to Ransburg Industrial Finishing K.K., discloses a pattern control airflow that intersects a shaping airflow from radially inside at the position near to and radially outwardly apart from the outer perimeter of the atomizer's bell cup.

U.S. Pat. No. 9,943,864, assigned to Ransburg Industrial Finishing K.K., discloses shaping air discharged from air ports twisted in a second direction opposite the first direction of the rotary atomizing head.

Without being bound by theory, the aforementioned patents generally disclose the interaction of airjets once ejected from the stationary end face of the rotary atomizer. No mixing of the source air forming the airjets (e.g., $R_{46}$ in the '850 Patent) occurs prior to exiting the first and second orifices of the end face. Further, none of the aforementioned patents disclose a mixing chamber for combining the shaping air. Even further, neither patent discloses recesses formed into the annular end face.

SUMMARY

According to an aspect of the present disclosure, a shaping air ring for a rotary bell atomizer spray device includes a plurality of nozzles disposed in the shaping air ring. Each nozzle of the plurality of nozzles includes a mix chamber having a first inlet, a second inlet, and an outlet; a first source air passage formed in the shaping air ring, wherein the first source air passage extends to the first inlet; and a second source air passage formed in the shaping air ring, wherein the second source air passage extends to the second inlet.

According to an additional or alternative aspect of the present disclosure, a rotary atomizer spray device for coating a surface includes an atomizing bell cup disposed to rotate on an axis of rotation and configured to deliver a coating material; and a shaping air ring spaced radially outward of the atomizing bell cup, the shaping air ring comprising a plurality of nozzles circumferentially spaced about the axis. Each nozzle of the plurality of nozzles includes a mix chamber, a first inlet configured to provide a first portion of pressurized air to the mix chamber, a second inlet configured to provide a second portion of pressurized air to the mix chamber, and an outlet configured to discharge a combined flow formed from the first portion of the pressurized air and the second portion of the pressurized air.

According to another additional or alternative aspect of the present disclosure, a method for shaping air for a rotary bell atomizer spray device includes flowing a first portion of pressurized air to a mix chamber through a first source air passage in a body of a shaping air ring, the first source air passage disposed to extend substantially parallel to an axis of rotation of the spray device; flowing a second portion of pressurized air to the mix chamber through a second source air passage in the body of the shaping air ring, the second source air passage disposed at an angle relative to the first source air passage; mixing the first portion of pressurized air and the second portion of pressurized air in the mix chamber to generate a combined flow of pressurized air; and emitting the combined flow of pressurized air from the body of the shaping air ring by an outlet of the mix chamber.

The present summary is provided only by way of example, and not limitation. Other aspects of the present disclosure will be appreciated in view of the entirety of the present disclosure, including the entire text, claims and accompanying figures.

Figure 1:
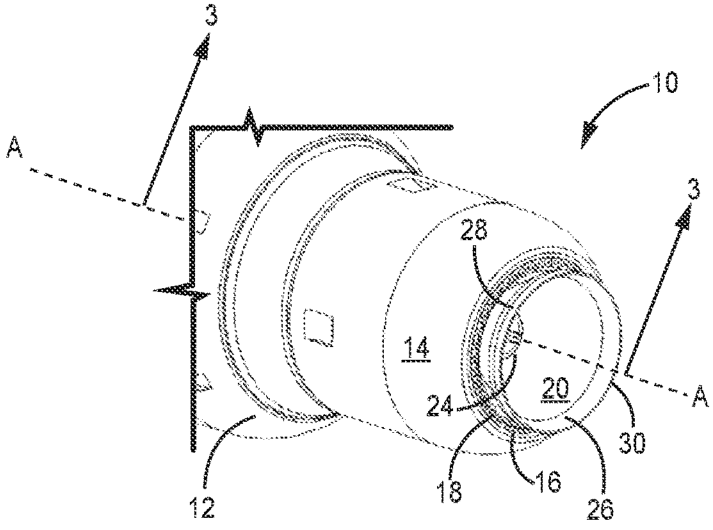
FIG. 1 is a perspective view of one embodiment of a spray head of a rotary bell atomizer spray device.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to an air ring for a rotary bell atomizer spray device that provides improved spray pattern control and increased efficiency. The air ring, which can also be referred to as a shaping air ring, of the present disclosure combines straight and angled air passages in a combined shaping air passage to provide a single shaping air stream. The air ring includes multiple nozzles that emit the combined air stream. The nozzles include the multiple upstream air passages that combine in a mix chamber. The combined air stream formed within the mix chamber exits through an outlet orifice. Controlling interaction of the two shaping air streams in the shaping air ring provides greater shaping control, which improves efficiency of the device, reduces overspray, saves costs, and prevents clogging, among other advantages.

FIG. 1 is a perspective view of one embodiment of a spray head 10 of a rotary bell atomizer spray device for applying a coating material to a workpiece. FIG. 1 shows rotary bell atomizer spray housing 12, cover 14, shaping air ring 16, nozzles 18, bell cup 20, splash plate 24, inner surface 26, outer surface 28, peripheral edge 30, and axis of rotation A.

Bell cup 20 has inner surface 26, outer surface 28, and peripheral edge 30. Bell cup 20 is attached to rotor shaft 22 (shown in FIG. 2) and extends upstream of cover 14 and shaping air ring 16. Shaping air ring 16 is housed in cover 14. Shaping air ring 16 has nozzles 18. Shaping air ring 16 is positioned to surround bell cup peripheral edge 30 upstream of peripheral edge 30 to direct shaping air ejected from nozzles 18 toward bell cup peripheral edge 30. The terms "upstream" and "downstream" refer to a direction of flow of coating material and shaping air during operation. Rotor shaft 22 (shown in FIG. 2) is disposed on axis of rotation A. Shaping air ring 16 is concentric with bell cup 20. Housing 12 of the rotary bell atomizer spray device additionally includes a drive mechanism, coating supply channel, and shaping air supply channels as known in the art but not illustrated. It will be understood by one of ordinary skill in the art that spray head 10 and components and teachings thereof can be adapted for use with conventional rotary bell atomizer spray devices.

Bell cup 20 is rotationally driven at high speed about axis of rotation A. Housing 12, cover 14, and shaping air ring 16 are stationary with respect to bell cup 20 and do not rotate. Coating material is supplied through housing 12 to a back side of splash plate 24. Splash plate 24 is fixed to rotor 22 and rotates. Coating material is distributed via splash plate 24 to inner surface 26 of bell cup 20. Inner surface 26 of bell cup 20 faces the workpiece. An opposite outer surface 28 of bell cup 20 faces cover 14 and shaping air ring 16. During operation, coating material is carried by centrifugal force to peripheral edge 30 of bell cup 20. As illustrated in FIG. 1, bell cup 20 can have a substantially frustoconical shape. In alternative embodiments, bell cup 20 can have a substantially cylindrical outer surface 28 with a frustoconical inner surface 26.

Shaping air ring 16 includes a plurality of nozzles 18. As illustrated in FIG. 1, in some examples the plurality of nozzles 18 are circumferentially arranged around shaping air ring 16. In some examples, the nozzle 18 are evenly spaced radially away from axis A. However, without being bound by theory, there can be some applications that require a plurality of traditional, non-combined air stream orifices (not shown) spaced between or adjacent to the plurality of nozzles 18. Outlets 19 of nozzles 18 are disposed on end face 40 of shaping air ring 16 facing the outer surface 28 of bell cup 20 to direct shaping air toward bell cup peripheral edge 30 and the workpiece to be coated. In some examples, the shaping air is directed to not impinge on the peripheral edge 30. As described further below, nozzles 18 combine separate air streams having different directions of flow in shaping air ring 16. The separate air streams are combined upstream of the outlet 72. In contrast to prior art designs, which combine shaping air streams at a location downstream of and outside of the shaping air ring, if the air is combined at all, shaping air ring 16 combines two different shaping air streams prior to ejection from shaping air ring 16. Controlling interaction of the two shaping air streams in shaping air ring 16 provides greater shaping control. Shaping air ring 16 additionally effectively reduces or eliminates back spray, thereby preventing coating material from clogging nozzles 18. Nozzles 18 can be circumferentially separated by a uniform spacing, though it is understood that not all examples are so limited. Nozzles 18 can be spaced in any desired manner that provides effective containment and transport of a coating material during operation for desired spray pattern shaping, such as desired minimum and maximum spray pattern widths.

As described further below, cover 14 houses shaping air ring 16 and can, in some examples, define a radially outer boundary of an air supply plenum for nozzles 18.

During operation, a coating material is supplied to the inner surface 26 of the rotating bell cup 20 via splash plate 24. The coating material is driven by centrifugal force due to rotation of bell cup 20 toward and outward from peripheral edge 30 of bell cup 20 where it is released as atomized droplets. The atomized droplets are entrained by high velocity shaping air ejected from nozzles 18 and transported to a workpiece in a generally frustoconical-shaped coating spray. The shaping air effectively shrouds the atomized droplets released from peripheral edge 30 of bell cup 20 thereby constraining further radial transport of the atomized droplets from peripheral edge 30. The shaping air carries the atomized droplets in a generally axial direction toward the workpiece. A spray pattern can be adjusted (i.e., narrowed or widened) by adjusting a pressure of shaping air as is described further below. Housing 12 can be mounted to a support structure or robotic arm for automated coating. Housing 12 can include and/or be connected to a handle for handheld operation. For example, a user can grasp the handle and actuate a trigger with the hand grasping the handle to cause spraying.

Figure 2:
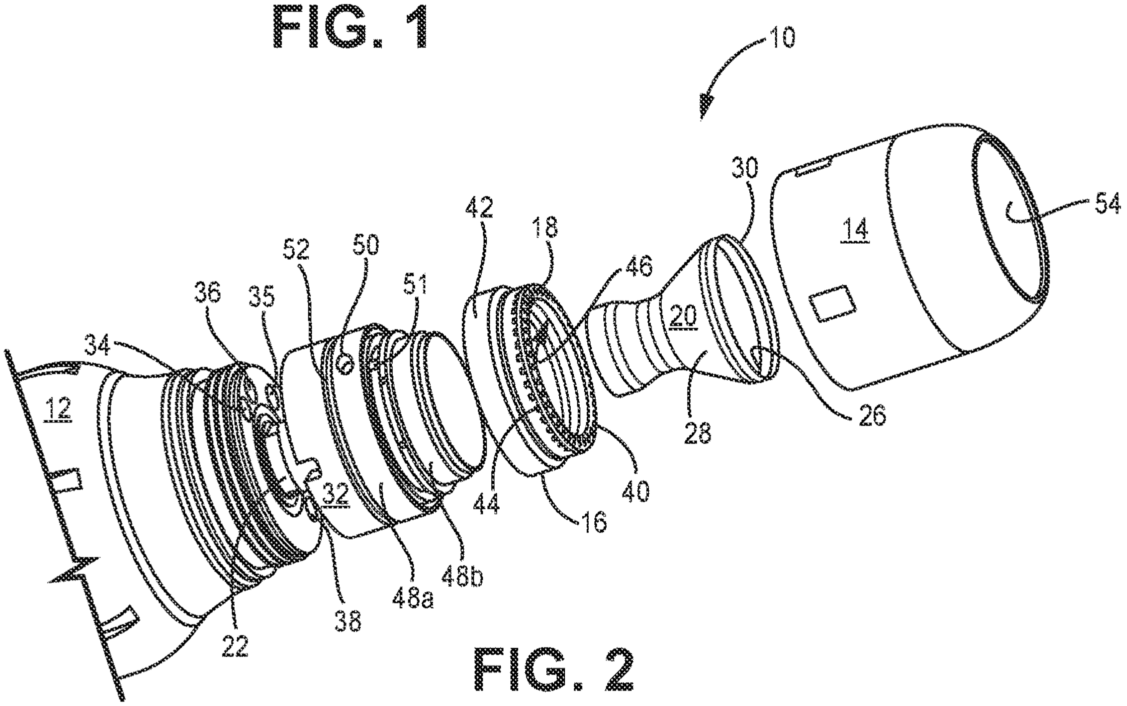
FIG. 2 is an exploded view of the spray head of FIG. 1.

FIG. 2 is an exploded view of spray head 10. FIG. 2 shows a portion of housing 12, cover 14, shaping air ring 16, bell cup 20, rotor shaft 22, bell cup inner surface 26, bell cup outer surface 28, bell cup peripheral edge 30, inner air cap 32, passages 34, 35, 36, alignment pin hole 38, end face 40, shaping air ring outer surface 42, first inlet passages 44, shaping air ring inner surface 46, inner air cap outer surfaces 48*a* and 48*b*, inner air cap first air supply outlet 50, inner air cap second air supply outlet 51, and inner air cap slot 52.

Rotor shaft 22 connects to bell cup 20 to rotationally drive bell cup 20. Housing 12 can include a plurality of passages 34, 35, 36, and an alignment pin hole 38. Inner air cap 32 is disposed between housing 12 and shaping air ring 16. Inner air cap has radially outer surfaces 48*a* and 48*b*, first air supply outlet 50, second air supply outlet 51, and slot 52. Shaping air ring 16 has end face 40, radially outer surface 42, radially inner surface 46, nozzles 18, and straight shaping air inlet passages 44. First air supply outlet 50 can also be considered to be a straight shaping air supply outlet. Second air supply outlet 51 can also be considered to be an angled shaping air supply outlet. The terms "straight shaping air" and "angled shaping air" refer to a direction of shaping air passages that feed nozzles 18 as is described further below. The term straight can mean axial (e.g., parallel to) relative to the spray axis A of spray gun 10 and the term angled can mean transverse relative to the spray axis A. Cover 14 has inner surface 54.

Housing orifices 34 and 35 are configured to deliver pressurized air to spray head 10. Passage 34 can be configured to deliver pressurized air to a first shaping air plenum. Passage 35 can be configured to deliver pressurized air to a second shaping air plenum. Passage 36 can be configured to deliver solvent to head 10. Solvent can be sprayed on outer surface 28 of bell cup 20 to clean bell cup 20 following a coating operation. Alignment pin hole 38 can be configured to receive a locating feature, such as a pin, post, stud, etc., to rotationally fix inner air cap 32 to housing 12.

Inner air cap 32 has an annular body disposed about axis A and concentric with rotor shaft 22 and bell cup 20. Inner air cap 32 is configured to remain stationary during spray operation. Inner air cap 32 provides two separate shaping air plenums to supply shaping air to shaping air ring 16. Inner air cap 32 is secured to housing 12 such that inlets (not shown) to the air plenums are aligned with corresponding passages 34 and 35. Inner air cap 32 includes first air supply outlet 50 opening to radially outer surface 48*a*. Outlet 50 opens to an outer plenum formed between radially outer surface 48*a* of inner air cap 32 and inner surface 54 of cover 14. Inner air cap 32 can include slot 52 configured to receive an O-ring, which can form a seal against inner surface 54 of cover 14. Inner air cap 32 includes second air supply outlet 51 opening to radially outer surface 48*b*. Outlet 51 opens to an inner plenum formed between radially outer surface 48*b* of inner air cap 32 and radially inner surface 46 of shaping air ring 16, as described further below. Inner air cap 32 can have complex internal structures to deliver shaping air and solvent to desired locations within and through spray head 10.

Shaping air ring 16 can be secured to a downstream end of inner air cap 32 by a friction fit. An additional O-ring (not shown) disposed on radially outer surface 48 of inner air cap 32 can provide an additional seal for the outer plenum formed between inner air cap 32 and cover 14. As described further below, shaping air ring 16 can include complex internal structures configured to deliver pressurized air.

Shaping air ring 16 and inner air cap 32 are formed as separate components for ease of manufacturing via conventional machining techniques. In other embodiments, shaping air ring 16 and inner air cap 32 may be formed as a unitary structure, for example, by an additive manufacturing processes, among other options.

First air inlet passages 44 are circumferentially spaced about shaping air ring 16 with openings through radially outer surface 42 of shaping air ring 16. First air inlet passages 44 can be evenly spaced circumferentially about axis A. Each straight shaping air inlet passage 44 can be connected to one nozzle 18 through end face 40.

Bell cup 20 is received through central openings in each of shaping air ring 16 and inner air cap 32. Bell cup 20 can threadedly coupled to rotor shaft 22, among other connection options.

Cover 14 can be threadedly secured to housing 12. Cover 14 can provide the radially outer plenum boundary for a portion of the pressurized air, such as pressurized air that feeds first air inlets 44. Cover 14 can provide the radially out plenum boundary for the straight shaping air portion.

Figure 3:
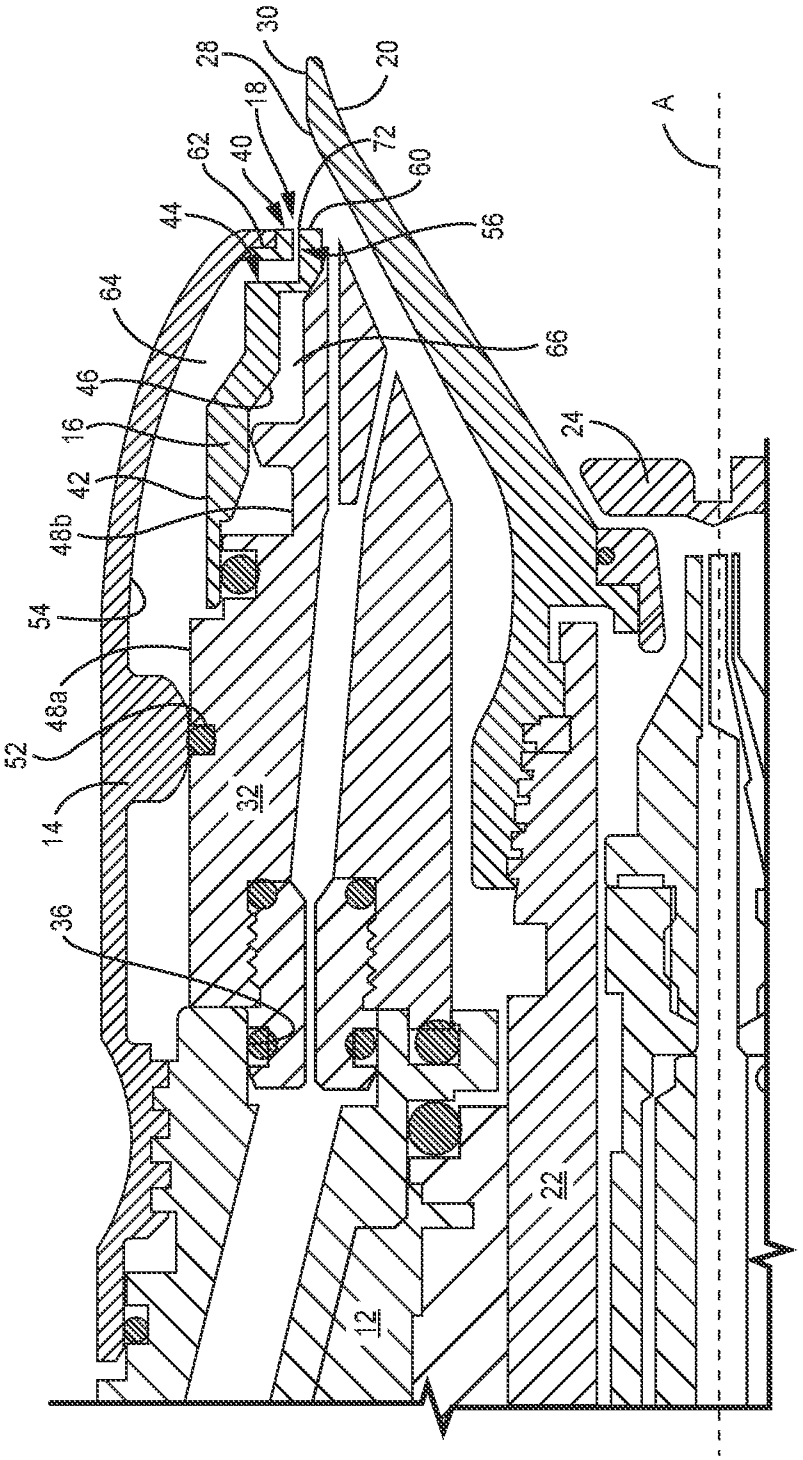
FIG. 3 is a cross-sectional view of a portion of the spray head taken along the 3-3 line of FIG. 1.

FIG. 3 is a cross-sectional view of a portion of spray head 10. FIG. 3 Shows housing 12, cover 14, shaping air ring 16, nozzle 18, rotor shaft 22, splash plate 24, inner air cap 32, end face 40, shaping air ring radially outer surface 42, first air feed passage 44, shaping air ring radially inner surface 46, inner air cap radially outer surfaces 48*a* and 48*b*, cover inner surface 54, first air source passage 56, second air feed passage 58 (best seen in FIG. 6), shaping air ring annular flange 60, shaping air ring recessed wall 62, outer plenum 64, and inner plenum 66.

As described above, bell cup 20 is coupled to rotor shaft 22, which is disposed through housing 12. Inner air cap 32 is coupled to housing 12. Shaping air ring 16 is coupled to inner air cap 32. Cover 14 is provided over shaping air ring 16 and inner air cap 32 and coupled to housing 12. FIG. 3 is provided to further illustrate shaping air ring 16 and how shaping air is provided to shaping air ring 16.

Shaping air ring 16 has outer surface 42, inner surface 46, and end face 40. As illustrated in FIG. 3, shaping air ring 16 can have recessed wall 62 on a radially outer portion of end face 40. Recessed wall 62 can be coupled to cover 14. Cover 14 can be threadedly fastened to housing 12 such that cover 14 is tightly secured against recessed wall 62. Shaping air ring 16 can include annular flange 60. Annular flange 60 can extend radially inward and can tightly abut outer surface 48 of inner air cap 32. First air source passages 56, second air feed passages 58, and second air passages (not shown) can be disposed in annular flange 60.

First air supply outlet 50 (shown in FIG. 2) on inner air cap 32 opens to outer plenum 64 formed between outer surface 48*a* of inner air cap 32 and inner surface 54 of cover 14. A first portion of the pressurized air (e.g., one of the straight and angled shaping airs) is channeled through inner air cap 32 to outer plenum 64. A second portion of the pressurized air (e.g., one of the straight and angled shaping airs) is channeled through inner air cap 32 to inner plenum 66 formed between inner surface 46 of shaping air ring 16 and outer surface 48*b* of inner air cap 32. Outer plenum 64 and inner plenum 66 can be sealed (e.g., by one or more elastomer seals, such as O-rings) to prevent shaping air from leaking. Outer plenum 64 and inner plenum 66 can be annular, fully extending around outer and inner surfaces 42 and 46, respectively, of shaping air ring 16.

First air feed passage 44 is open to outer plenum 64. First air feed passage 44 connects outer plenum 64 with first air source passage 56. As discussed with respect to FIG. 2, a plurality of the first air feed passages 44 are circumferentially spaced about shaping air ring 16 with openings on outer surface 42 of shaping air ring 16. Each first air feed passage 44 connects outer plenum 64 to a first air source passage 56 in shaping air ring 16. First air feed passages 44 can be oriented substantially perpendicular to axis of rotation A. First air feed passages 44 can be oriented orthogonal to axis A and/or to a line parallel with axis A. First air source passages 56 can be oriented substantially parallel to axis of rotation A. A widest portion of first air feed passages 44 can be larger than a widest portion of first air source passages 56, such that shaping air flow rate is increased through the smaller size air source passages 56. In some examples, air feed passages 44 have a larger diameter than a diameter of air source passages 56. As illustrated in FIG. 3, first air source passages 56 are oriented parallel to bell cup peripheral edge 30. Outlets of first air source passages 56 can be positioned slightly radially outward from peripheral edge 30 to space the interface between the shaping air and coating material from the peripheral edge 30, such as less than 5 mm from peripheral edge 30. As such, the output from first air source passages 56 is, in some examples, not directed at peripheral edge 30 but is instead directed at a location spaced from peripheral edge 30. In some embodiments, straight shaping air source passages 56 can be disposed less than 2 mm, or less than 1 mm, radially outward of peripheral edge 30. Spacing the air from peripheral edge 30 prevents impingement with peripheral edge 30 that can lead to the generation of eddy currents and turbulence. Spacing the air from peripheral edge 30 provides enhanced pattern control and good pattern consistency.

A second air supply outlet 51 (FIG. 2) on inner air cap 32 is open to inner plenum 66. Angled shaping air feed passage 58 (best seen in FIG. 6) connects inner plenum 66 with an angled air passage 74 (best seen in FIG. 6). A plurality of the second air feed passages 58 are circumferentially spaced about shaping air ring 16 with openings on inner surface 46 of shaping air ring 16. In some examples, the second air feed passages 58 are uniformly spaced circumferentially about shaping air ring 16. Openings of second air feed passages 58 can be disposed on an upstream side of flange 60 opposite end face 40. Second air feed passages 58 can be evenly spaced. Each second air feed passage 58 can feed a single nozzle 18. Second air feed passages 58 can be oriented substantially parallel to axis of rotation A and to first air source passages 56. Depending on the location of plenum 66, in some embodiments, second air feed passages 58 can be angled toward axis A, such that an upstream end of each air feed passage 58 is oriented further radially from axis A than the downstream end of each feed air passage 58. Each second air feed passage 58 can be disposed between adjacent first air feed passages 56. As described further below, a diameter of second air feed passages 58 can be greater than a diameter of the second air passages 74 such that the volumetric flow rate can be increased through the reduced diameter air passages 74 relative to the air feed passages 58. As such, air source passages 74 form the restriction in the flowpath of the angled air portion. Having the downstream air source passage 74 form the restriction in the air passage 19*b* provides a consistent output to mix chamber 69 and downstream out of mix chamber 69. Shaping air rings 16 may require removal and replacement. The downstream-most portion of air passage 19*b* forming the restriction further provides consistency between parts such that different shaping air rings 16 generate substantially the same patterns at the same pressures.

Figure 4:
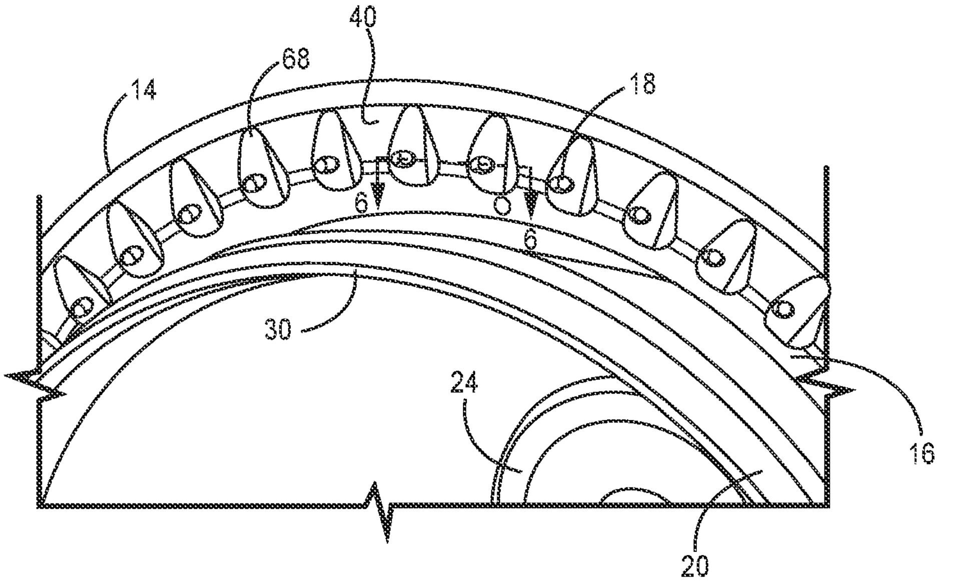
FIG. 4 is a partial front perspective view of the spray head of FIG. 1.
Figure 5:
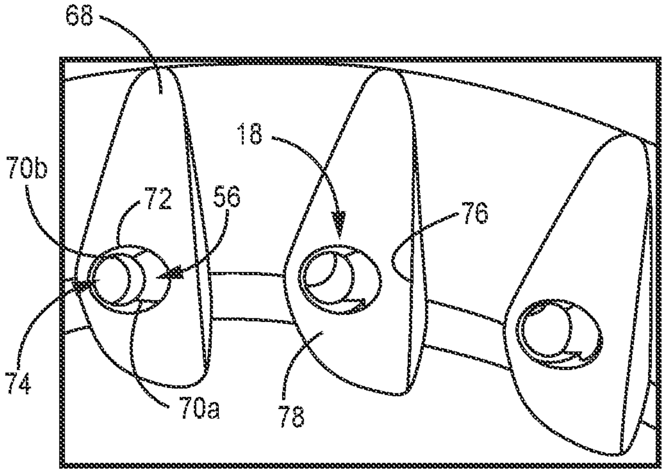
FIG. 5 is an enlarged view of combined shaping air passages of a shaping air ring of the spray head of FIG. 3.

FIG. 4 is a partial front perspective view of the spray head 10. FIG. 4 shows cover 14, shaping air ring 16 with end face 40, nozzles 18, bell cup 20, and recesses 68. FIG. 5 is an enlarged view of a portion of shaping air ring 16 showing nozzles 18. FIG. 5 additionally shows inlets 70*a* and 70*b*, outlet 72, first air source passage 56, second air source passage 74, and walls 76 and 78. Nozzle 18 includes mix chamber 69 having inlets 70*a* and 70*b* and outlet 72. Walls 76 and 78 form recess 68.

Inlet 70*a* is formed at the intersection of first air source passage 56 and mix chamber 69. Inlet 70*b* is formed at the intersection of second air source passage 74 and mix chamber 69. Inlets 70*a*, 70*b* provide locations for the pressurized air to enter into mix chamber 69. Outlet 72 forms an outlet for the mixed air streams fed by first air source passage 56 and second air source passage 74 to exit from mix chamber 69. As shown, outlet 72 can expand or otherwise diverse between mix chamber 69 and the surface of recess 68. In some examples, the first and second shaping air passages 56 and 74 intersect rather than emitting air into mix chamber 69 at fully separated and distinct inlets 70*a*, 70*b*. As such, a combined area of inlets 70*a* and 70*b* at mix chamber 69 can be less than the combined cross-sectional areas of first air source passage 56 and second air source passage 74. The areas can be the cross-sectional areas taken generally orthogonal to the direction of flow through the air source passage 56, 74. In some examples, mix chamber 69 is tapered inward in geometry such that mix chamber 69 converges or decreases in cross-sectional area from inlets 70*a*, 70*b* to outlet 72. Mix chamber 69 can thereby decrease in cross-sectional area between the inlet, upstream end of mix chamber 69 and the outlet, downstream end of mix chamber 69. Mix chamber 69 forms a region in which straight and angled shaping air streams can mix before being ejected from shaping air ring 16. A perimeter of nozzle 18 at a surface of end face 40 (i.e., outlet 72) can have a substantially oval shape, among other options.

Recess 68 is a depression or removal of material that extends into end face 40. Recess 68 can include walls 76 and 78. Recess 68 can extend substantially radially between a radially outer diameter and a radially inner diameter of end face 40. Wall 78 can cut into end face 40 at a steep angle. Wall 76 can cut into end face 40 at a shallow angle such that wall 76 is elongated in a circumferential direction relative to wall 78. Wall 76 can be angled to provide substantially unobstructed flow from nozzle 18. In some examples, recess 68 can be considered to form a diffuser portion of nozzle 18. Wall 76 can be angled to substantially correspond to an angle of second air source passage 74 and can be substantially aligned with second air source passage 74. Walls 78 and 76 can form a V-shape. Walls 78 and 76 can be substantially flat or can have a curvature. Outlet 74 of mix chamber 69 can be disposed at an intersection of walls 76 and 78 or in wall 78. In some examples, an intersection between walls 76 and 78 can be rounded to provide a smooth transition between walls 76 and 78.

The geometry of recess 68 is not limited to that described herein. Recess 68 can be shaped to improve flow from nozzle 18. It will be understood by one of ordinary skill in the art to adapt a geometry of recess 68 to the flow components of shaping air ejected from nozzle 18. For example, recess 68 can be formed as a scallop, rounded depression, of various chambers having differing geometries, or in any other desired manner. As a further example, in the illustrated example of FIG. 6A, recess 68 has at least one curved surface. However, in some other examples, recess 68 can be structured with at least one planar/flat surface for some applications. In additional or alternative embodiments, some or all of recesses 68 can be eliminated and nozzles 18 can be formed such that outlet 72 is through end face 40. In either instance, nozzle 18 is configured such that inlets 70*a*, 70*b* are recessed into end face 40. Inlets 70*a*, 70*b* can be recessed such that no portion of either inlet 70*a*, 70*b* forms any part of outlet 72. A portion of mix chamber 69 is thus disposed between each of inlets 70*a*, 70*b* and outlet 72.

Figure 6A:
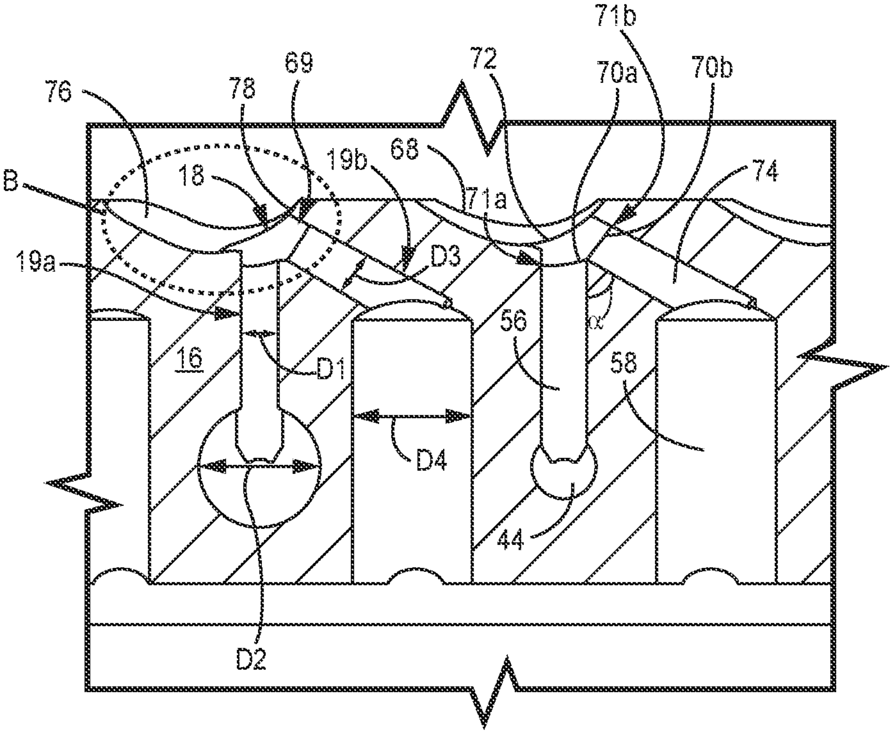
FIG. 6A is cross-sectional view of the combined shaping air passages taken along the 6-6 line of FIG. 4.
Figure 6B:
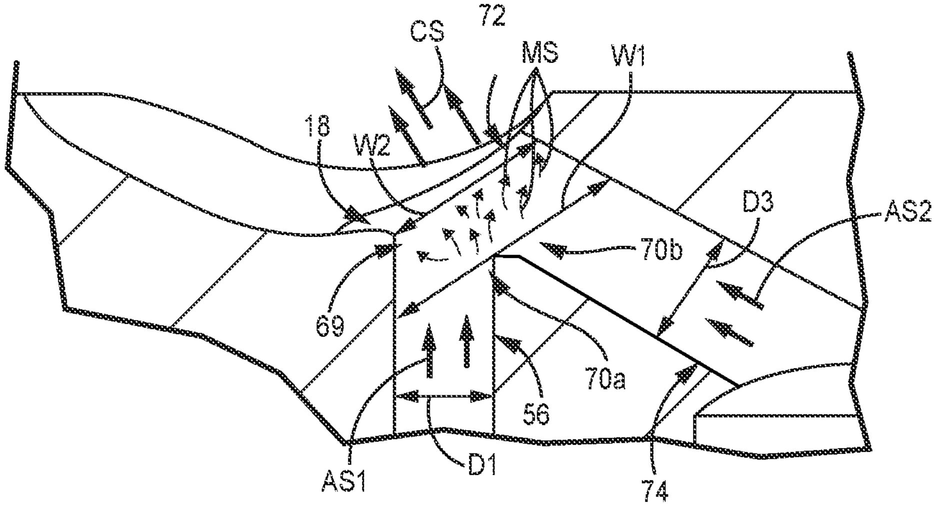
FIG. 6B is an enlarged view of detail B in FIG. 6A.

FIG. 6A is cross-sectional view of shaping air ring 16 taken along the 6-6 line of FIG. 5. FIG. 6B is an enlarged view of detail B in FIG. 6A showing mixing of the first air stream AS1 from upstream air passage 19*a* with the second air stream AS2 from air passage 19B to form the combined air stream CS emitted by nozzle 18. FIG. 6A shows shaping air ring 16, recesses 68, and nozzles 18. Each nozzle 18 includes mixing chamber 69, inlets 70*a*, 70*b*, and outlet 72. First air source passages 56 having diameter D1, second air source passages 74 having diameter D3, first air feed passages 44, and second air feed passages 58 define the upstream air passages 19*a*, 19*b* of nozzle 18.

First air feed passages 44 connect outer plenum 64 (shown in FIG. 3) with first air source passages 56. First air feed passages 44 can be oriented radially relative to axis A. Second air feed passages 58 connect inner plenum 66 (shown in FIG. 3) with second air source passages 74. First air feed passages 44 can be disposed substantially perpendicular to first air source passages 56. First air source passages 56 can be disposed generally parallel to axis A. Second air feed passages 58 can be disposed at least partially in the same plane as angled shaping air source passages 74. Second air feed passages 58 can be oriented generally parallel to axis A. In some examples, second air feed passages 58 are oriented parallel to first air source passages 56. Each set of second air feed passages 58 and second air source passages 74 can be disposed circumferentially between adjacent sets of straight shaping air feed passages 44 and passages 56. As such, upstream air passages 19*a*, 19*b* can alternate circumferentially around axis A. For example, each upstream air passage 19*a* can be disposed circumferentially between air passages 19*b*, while each upstream air passage 19*b* can be disposed circumferentially between air passages 19*a*.

First air source passages 56 can extend substantially parallel to axis A. First air source passages 56 are oriented to eject pressurized air in a direction substantially axially and toward peripheral edge 30 of bell cup 20. In some examples, a centerline through first air source passage 56 can extend along a plane that axis A also extends along. Second air source passages 74 can be angled in a circumferential direction relative to axis A. Second air source passages 74 can be oriented such that a centerline through second air source passages 74 is transverse to plane that axis A extends along. Second air source passages 74 can be oriented to eject shaping air toward peripheral edge 30 of bell cup 20 in a direction opposite the direction of rotation of bell cup 20. In some embodiments, second air source passages 74 can be angled with respect to axis A in a range of 40° to 70° and, more specifically between 55° and 65°, as shown by angle α in FIG. 6A. As shown, second air source passages 74 can be angled by the same degree with respect to axis A and first air source passage 56. In some embodiments angled shaping air source passages 74 can be inclined in a radial direction from second air feed passages 58 to inlets 70*b* of nozzles 18. For example, the intersection of second air source passage 74 with second air feed passage 58 can be radially closer to axis A than the outlet 70*b*. In some embodiments, second air source passages 74 can be inclined in a range of 5° to 15° between the inlet at air feed passage 58 and the outlet 70*b*. An incline of second air source passages 74 can be adjusted based on the position of nozzles 18 with respect to peripheral edge 30 of bell cup 20 and flow dynamics of the shaping air.

First air source passages 56 can have a diameter D1 smaller than diameter D2 of first air feed passages 44 to increase flow velocity in first air source passage 56. The downstream portion of air passage 19*a* (e.g., first air source passage 56) forms the restriction in that passage 19*a* to accelerate the air flow out of air passage 19*a* and into mix chamber 69. Similarly, second air source passages 74 can have a diameter D3 smaller than diameter D4 of second air feed passages 58 to increase flow velocity in second air source passages 74 relative to air feed passages 58. The downstream portion of air passage 19*b* (e.g., second air source passage 74) forms the restriction in that passage 19*b* to accelerate the air flow out of air passage 19*b* and into mix chamber 69. Accelerating the airflows into mix chamber 69 facilitates combination of air streams to form the combined air stream CS. Accelerating the airflows into mix chamber 69, and thus at the downstream end of nozzle 18, provides improved control over the shape of the resultant spray pattern.

Second air source passage 74 intersects first air source passage 56 at the upstream end of mixing chamber 69. In the example show, first air source passage 56 provides pressurized air to mix chamber 69 at inlet 70*a* and second air source passage 74 provides pressurized air to mix chamber at inlet 70*b*. Mix chamber 69 is recessed in shaping air ring 16. In the example shown, outlet 72 of nozzle 18 is disposed below the outer surface of shaping air ring 16 by recess 68. Mix chamber 69 is spaced axially from end face 40 of air ring 16. In the example shown, inlets 70*a*, 70*b* are disposed within the air ring 16 at a location spaced from the exterior surface. As such, neither first air source passage 56 nor second air source passage 74 may extend fully to the exterior surface of air ring 16. Inlet 70*a* is spaced upstream from and does not terminate at outlet 72. Inlet 70*b* is spaced upstream from and does not terminate at outlet 72.

An opening of second air source passage 74 at inlet 70*b* can have a substantially circular cross-section intersecting with the outlet 70*a* of first air source passage 56. An opening 70*a* of first air source passage 56 can have a substantially circular cross-section intersecting with the outlet 70*b* of second air source passage 74.

Mixing chamber 69 defines a mixing region for a straight shaping air stream and angled shaping air stream to combine within shaping air ring 16 and form a combined air stream. Nozzles 18 can be formed such that outlet 72 extends into end face 40 and recess 68 at multiple outlet angles (e.g., outlet 72 may not be a flat opening) including having portions substantially perpendicular to one or both of second air source passages 74 and first air source passages 56. Mix chamber 69 can taper outward in geometry or diverge in cross-sectional area from inlet 70 to outlet 72.

During operation, pressurized air AS2 from second air source passage 74 interacts with pressurized air AS1 from first air source passage 56 within mix chamber 69, as best seen in FIG. 6B. The first air stream AS1 and the second air stream AS2 mix within mix chamber 69 to form a combined air stream CS that is ejected from shaping air ring 16 as a single jet of shaping air. The air streams mix within mix chamber 69, as shown by arrows MS representing the combined air within mix chamber 69 and upstream of outlet 72. Mix chamber 69 has a first width W1 at an upstream end of the mix chamber 69 and a second width W2 at a downstream end of the mix chamber 69 (e.g., at outlet 72). The second width W2 can be a widest portion of the opening forming outlet 72. As shown, the second width W2 can be taken at the widest point of opening at the upstream end of outlet 72. It is understood, however, that second width W2 can be taken at any desired location along the opening 72. The first width W1 can be taken parallel to second width W2. In some examples, the first width W1 can be taken between the intersection 71*a* of inlet 70*a* and an outer wall defining mix chamber 69 and the intersection 71*b* of inlet 70*b* and the outer wall. In the example shown, the first width W1 is taken at the upstream-most point of mix chamber 69 and parallel to width W2. The first width W1 can be considered to be taken at the upstream end of mix chamber 69 where passages 19*a*, 19*b* terminate into mix chamber 69 at inlets 70*a* and 70*b*, respectively. In some examples, the walls defining mix chamber 69 can be convergent in the flow direction such that the first width W1 is larger than the second width W2 and mix chamber 69 decreases in width between the first width W1 and the second width W2. The cross-sectional area of mix chamber 69 can decrease between the upstream end of the mix chamber 69 and the downstream end of the mix chamber 69 (e.g., at the upstream end of outlet 72). In some examples, widths W1 and W2 can be substantially similar such that the cross-sectional area of mix chamber 69 remains steady in the flow direction between the inlets 70*a*, 70*b* and outlet 72.

In some examples, the first width W1 and the second width W2 are taken orthogonal to a combined flow direction. The combined flow direction can be a combination of the angle of the passage 56 and the angle of the passage 74. The combined flow direction can be intermediate the orientations of the first and second passages 56, 74, respectively, and can, in some examples, be a median angle therebetween. For example, if passage 74 is canted at 60-degrees relative to passage 56, then the combined flow direction can be canted at 30-degrees relative to passage 56, which is also 30-degrees relative to passage 74.

The direction or shape of shaping air can be controlled by independently adjusting the pressure of the first pressurized air stream AS1 and the second pressurized air stream AS1. For example, the first (e.g., straight) portion of the pressurized air can be used to generate smaller pattern sizes while the second (e.g., angled) portion of the pressurized air can be used to generate large pattern sizes. The first and second portions combining to form the combined air stream CS creates a single output that can be controlled to alter the spray pattern generated. The pressure ratio between the first air portion AS1 and the second air portion AS2 can be adjusted to control the size and shape of the spray pattern generated. As such, a single input can be used to adjust the spray pattern, simplifying operation, reducing part count, reducing costs, decreasing material waste utilized during pattern testing, and decreasing downtime.

Figure 7:
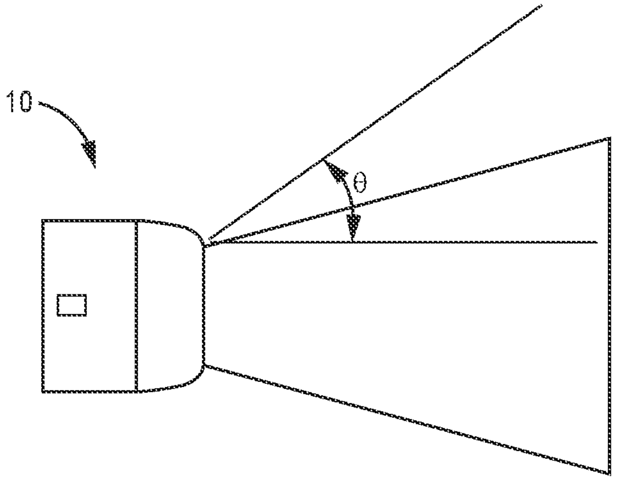
FIG. 7 is a side view of an atomized spray from the spray head of FIG. 1.

FIG. 7 is side view of an atomized spray from spray head 10 during operation. Angle θ indicates a variation in spray diameter that can be achieved by adjusting the pressure ratio between the straight shaping air portion and the angled shaping air portion. For example, a larger spray pattern can be achieved by increasing the pressure of angled shaping air relative to straight shaping air, while a smaller spray pattern is achieved by increasing a pressure of straight shaping air relative to angled shaping air.

Figure 8:
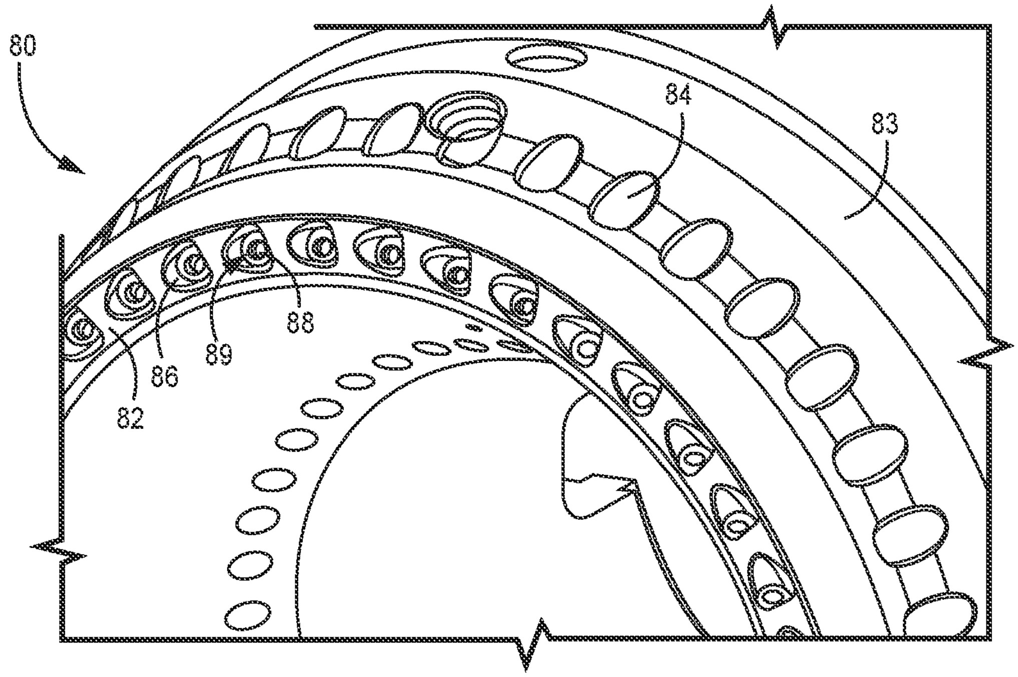
FIG. 8 is partial front perspective view of an alternative embodiment of a shaping air ring.

FIG. 8 is an isometric end view of an alternative embodiment of a shaping air ring. FIG. 8 shows shaping air ring 80 having end face 82 and radially outer surface 83, straight shaping air feed passages 84, protrusions 86, and combined nozzles 88. Shaping air ring 80 is substantially the same as shaping air ring 16 with the exception of locating nozzles 88 in protrusions 86 as opposed to recesses.

First air feed passages 84 are disposed through radial outer surface 83 to feed shaping air to first air supply passages (e.g., similar to passages 56) as described with respect to shaping air ring 16. Second air inlets (e.g., similar to second feed air passages 58 can be disposed in a radially inner surface of air ring 80 to feed shaping air to second air supply passages (e.g., similar to passages 74). The first and second air supply passages intersect in a mix chamber (e.g., similar to mix chamber 69) formed within shaping air ring 80. The air streams mix within mix chamber 69 prior to ejection of the combined air stream from shaping air ring 80. The first and second air source passages that emit air directly to the mix chamber 69 can be substantially the same as straight and angled shaping air passages 56 and 74, respectively, of shaping air ring 16.

Nozzles 88 are at least partially formed in protrusions 86. In the example shown, the outlet 89 (similar to outlet 72 of nozzle 18) of each nozzle 88 is formed on a portion of the protrusion 86 spaced away from the end face 82 of air ring 80. Protrusions 86 extend from end face 82 of shaping air ring 80. For example, protrusions 86 can be formed as mounds, bumps, nodules, etc. extending away from end face 82. Protrusions 86 can be considered to extend axially away from end face 82. Outlets 89 of nozzles 88 are spaced axially from end face 82. Protrusions 86 are circumferentially spaced according to a desired spacing of nozzles 88. Nozzles 88 can have one or more inlets recessed below a surface of shaping air ring 80 and an outlet downstream of the one or more inlets as described with respect to nozzles 18. Nozzles 88 function substantially the same as nozzles 18, allowing two portions of air to mix in shaping air ring 80 prior to being ejected from shaping air ring 80. The mixed air is ejected as a single jet of shaping air. Outlets 89 can be formed on one circumferential side of protrusions 86 to direct angled shaping air toward bell cup peripheral edge 30 (shown in FIG. 1) in a direction opposite rotation of bell cup 20. Protrusions 86 can have a semi-conical shape with nozzles 88 disposed on a base of the cone and apex disposed at the surface of end face 82. The angled shaping air passages can be substantially aligned with an orientation of protrusions 86 from apex to base. The semi-conical shape limits interruption of shaping air flow ejected from adjacent nozzles 88. The shape of protrusions 86 is not limited to the shape disclosed. It will be understood by one of ordinary skill in the art that protrusions of alternative shapes and sizes can be used to house combined shaping air passages 88 and allow straight and angled shaping air streams to mix in shaping air ring 80. In the example shown, the mixing chamber 69 can be at least partially formed in protrusion 86 such that the mixing chamber is wholly or partially formed at a location spaced axially from end face 82 and away from openings 84.

The disclosed shaping air rings improve control of shaping air, minimize or eliminate back spray of coating material, and improve spray device efficiency. Controlling interaction of two shaping air streams within a combined shaping air passage in shaping air ring provides for greater spray pattern control, which improves overall efficiency of the spray device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

The invention claimed is:

1. A shaping air ring for a rotary bell atomizer spray device, the shaping air ring comprising:

a plurality of nozzles disposed in the shaping air ring, wherein each nozzle of the plurality of nozzles comprises:

a mix chamber having a first inlet, a second inlet, and an outlet;

a first source air passage formed in the shaping air ring, wherein the first source air passage extends to the first inlet to output a first flow of shaping air through the first inlet, the first source air passage including a first feed air passage open on the shaping air ring to receive the first flow of shaping air into the shaping air ring; and a second source air passage formed in the shaping air ring, wherein the second source air passage extends to the second inlet to output a second flow of shaping air through the second inlet, the second source air passage including a second feed air passage open on the shaping air ring to receive the second flow of shaping air into the shaping air ring.

2. The shaping air ring of claim 1, wherein the shaping air ring extends about an axis and the outlet is spaced axially from an end face of the shaping air ring.

3. The shaping air ring of claim 2, wherein the end face comprises a plurality of recesses extending into the end face, and wherein the outlet of each nozzle of the plurality of nozzles is disposed in a recess of the plurality of recesses.

4. The shaping air ring of claim 1, wherein the shaping air ring is disposed about an axis and wherein the first source air passage extends substantially parallel to the axis.

5. The shaping air ring of claim 4, wherein the second source air passage is circumferentially angled relative to the axis.

6. The shaping air ring of claim 5 wherein the first feed air passage is open at a radially outer surface of the shaping air ring.

7. The shaping air ring of claim 5, wherein the second source air passage intersects the first source air passage at an angle between 40° to 70°, inclusive.

8. A rotary atomizer spray device for coating a surface, the device comprising:

an atomizing bell cup disposed to rotate on an axis of rotation and configured to deliver a coating material; and a shaping air ring spaced radially outward of the atomizing bell cup, the shaping air ring comprising a plurality of nozzles circumferentially spaced about the axis, a first source air passage including a first feed air passage open on the shaping air ring to receive a first portion of pressurized air into the shaping air ring, and a second source air passage including a second feed air passage open on the shaping air ring to receive a second portion of pressurized air into the shaping air ring;

wherein each nozzle of the plurality of nozzles includes:

a mix chamber, a first inlet configured to provide the first portion of pressurized air to the mix chamber, a second inlet configured to provide the second portion of pressurized air to the mix chamber, and an outlet configured to discharge a combined flow formed from the first portion of pressurized air and the second portion of pressurized air.

9. The device of claim 8, wherein the outlet is disposed on an end face of the shaping air ring, the end face configured to be oriented in a first axial direction along which the spray is emitted.

10. The device of claim 9, wherein the end face comprises a plurality of circumferentially spaced recesses, and wherein for each nozzle of the plurality of nozzles the outlet is disposed in a recess such that the outlet is spaced axially from the end face.

11. The device of claim 10, wherein the mix chamber has a first width at an upstream end of the mix chamber and a second width at a downstream end of the mix chamber, and wherein the first width varies from the second width.

12. The device of claim 10, wherein the first source air passage extends substantially parallel to the axis.

13. The device of claim 10 wherein the second source air passage is canted circumferentially relative to the axis.

14. The device of claim 10, wherein:

the first feed air passage has a first diameter and the first source air passage has a second diameter; and the first diameter is larger than the second diameter.

15. The device of claim 10, wherein the second source air passage is disposed at an angle in the range of 40° to 70°, inclusive, relative to the first source air passage.

* * * * *